(12) United States Patent
Hocker et al.

(10) Patent No.: US 7,959,159 B2
(45) Date of Patent: Jun. 14, 2011

(54) SEALING ARRANGEMENT

(75) Inventors: Klaus Hocker, Cleebronn (DE); Walter Schuhmacher, Bietigheim-Bissingen (DE); Clemens Schefzik, Ehningen (DE); Klaus Lang, Stuttgart (DE); Siamend Flo, Stuttgart (DE); Berthold Pfuhl, Markgröningen (DE); Heinz Siegel, Stuttgart (DE)

(73) Assignees: ElringKlinger AG, Dettingen (DE); Robert Bosch GmbH, Gerlingen-Schillerhöge (DE)

( * ) Notice: Subject to any disclaimer, the term of this patent is extended or adjusted under 35 U.S.C. 154(b) by 634 days.

(21) Appl. No.: 11/903,341

(22) Filed: Sep. 21, 2007

(65) Prior Publication Data

US 2008/0122184 A1 May 29, 2008

(30) Foreign Application Priority Data

Nov. 23, 2006 (DE) .......................... 10 2006 055 298

(51) Int. Cl.
*F16J 15/32* (2006.01)
(52) U.S. Cl. ......... 277/559; 277/562; 277/566; 277/567
(58) Field of Classification Search .................. 277/559, 277/562, 564, 566, 567, 563
See application file for complete search history.

(56) References Cited

U.S. PATENT DOCUMENTS

| | | | | |
|---|---|---|---|---|
| 2,088,703 A | * | 8/1937 | Hubbard et al. | 277/555 |
| 2,167,603 A | * | 7/1939 | Victor | 277/562 |
| 2,185,790 A | * | 1/1940 | Kosatka et al. | 277/562 |
| 2,446,380 A | * | 8/1948 | Meyers et al. | 277/559 |
| 2,841,429 A | * | 7/1958 | McCuistion | 277/402 |
| 3,215,441 A | * | 11/1965 | Horvereid | 277/437 |
| 3,218,087 A | | 11/1965 | Hallesy | 277/532 |
| 3,550,990 A | * | 12/1970 | Carlson, Jr. et al. | 277/566 |
| 3,612,551 A | * | 10/1971 | Grabill, Jr. | 277/566 |
| 3,854,737 A | * | 12/1974 | Gilliam, Sr. | 277/566 |
| 4,232,873 A | * | 11/1980 | Hock | 277/647 |
| 4,592,558 A | * | 6/1986 | Hopkins | 277/572 |
| 5,626,520 A | * | 5/1997 | Mazziotti | 464/131 |
| 5,671,656 A | | 9/1997 | Cyphers et al. | 92/172 |

(Continued)

FOREIGN PATENT DOCUMENTS

DE 34 03 686 A1 8/1985

(Continued)

*Primary Examiner* — Alison K Pickard

(57) ABSTRACT

In order to provide a seal arrangement for sealing between a first medium space filled with a first medium and a second medium space filled with a second medium which ensures reliable sealing between the medium spaces with very low leakage values even over a prolonged period of use, wherein said seal arrangement comprises a moveable component which is displaceable in the longitudinal direction thereof and/or rotatable about the longitudinal direction thereof and extends through the seal arrangement and wherein the seal arrangement comprises a sealing element which comprises a first sealing region that is sealing in relation to the first medium space and a second sealing region that is sealing in relation to the second medium space, wherein the first sealing region comprises a first dynamic sealing section abutting against the moveable component and the second sealing region comprises a second dynamic sealing section abutting against the moveable component and at least one of the two dynamic sealing sections has at least two sealing lips, it is proposed that each of the two sealing regions should comprise at least one respective spring element which biases the dynamic sealing section of the respective sealing region against the moveable component.

25 Claims, 8 Drawing Sheets

U.S. PATENT DOCUMENTS

Figure 1:
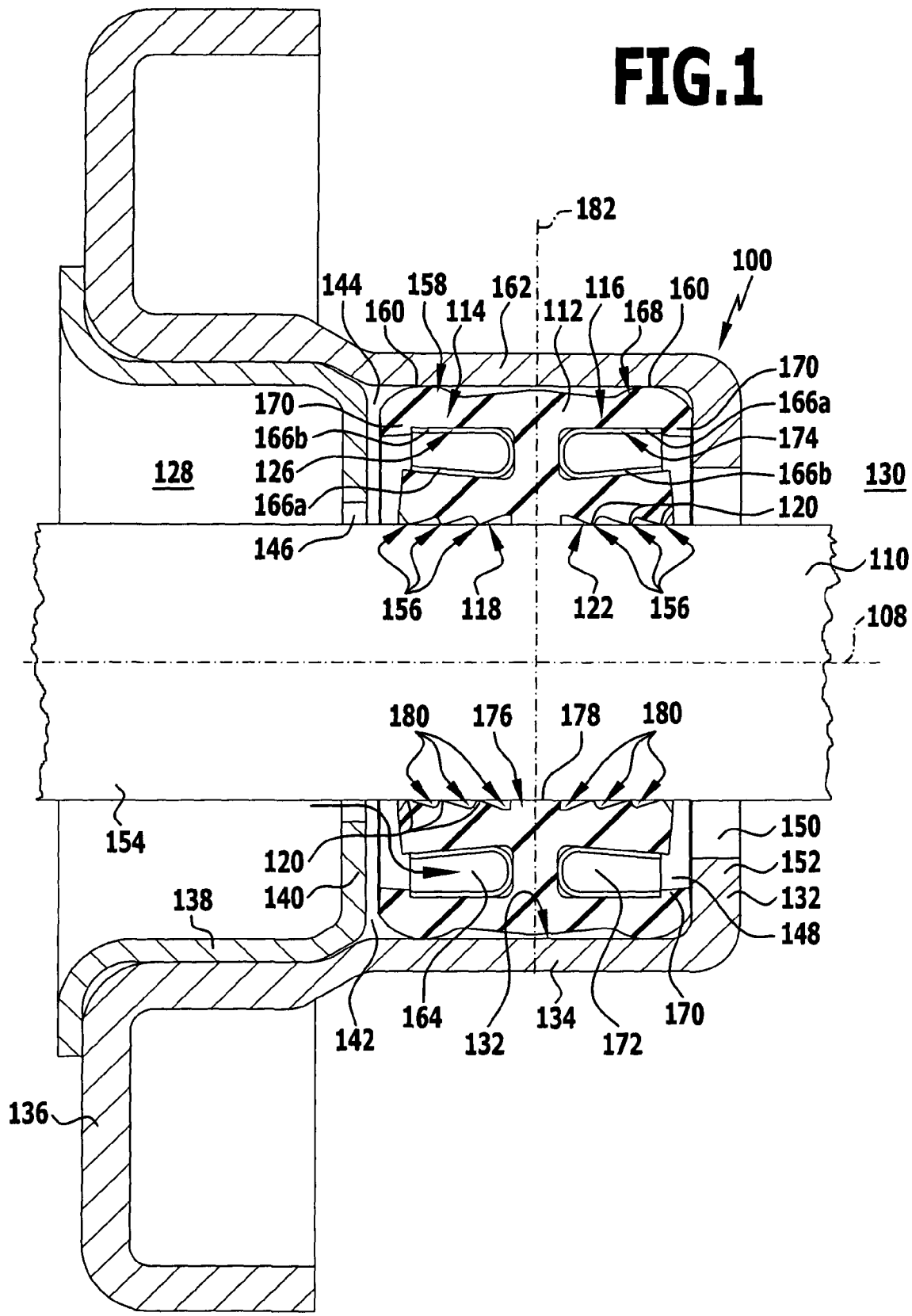

| | | | | |
|---|---|---|---|---|
| 5,897,119 A * | 4/1999 | McMillen | | 277/562 |
| 6,079,715 A * | 6/2000 | Johnen et al. | | 277/565 |
| 6,168,164 B1 * | 1/2001 | Toth et al. | | 277/559 |
| 6,705,617 B2 * | 3/2004 | Mellet et al. | | 277/559 |
| 6,726,211 B1 * | 4/2004 | Kuroki et al. | | 277/353 |
| 6,860,486 B2 * | 3/2005 | Hacker et al. | | 277/553 |
| 7,686,308 B2 * | 3/2010 | Van Schoor | | 277/551 |
| 2006/0103075 A1 | 5/2006 | Zahn | | 277/436 |
| 2007/0182103 A1 | 8/2007 | Okada et al. | | 277/551 |
| 2008/0073856 A1 * | 3/2008 | Munekata | | 277/559 |
| 2009/0302549 A1 | 12/2009 | Kondo et al. | | 277/562 |

FOREIGN PATENT DOCUMENTS

| | | |
|---|---|---|
| DE | 103 38 587 A1 | 3/2005 |
| DE | 10 2004 040 105 A1 | 3/2006 |
| EP | 1 273 835 A | 8/2001 |
| GB | 810 625 A | 9/1956 |
| GB | 2 296 538 A | 12/1995 |
| JP | 9-303569 A | 11/1997 |
| WO | WO 2005/100794 A1 | 10/2005 |
| WO | WO 2006/134756 A1 | 12/2006 |
| WO | WO 2007/082111 A1 | 7/2007 |

* cited by examiner

SEALING ARRANGEMENT

The present disclosure relates to the subject-matter which was disclosed in the German patent application No. 10 2006 055 298.9 of the 23 Nov. 2006. The entire description of this earlier application is incorporated by reference thereto as a constituent part of the present description ("incorporation by reference").

The present invention relates to a seal arrangement for sealing between a first medium space filled with a first medium and a second medium space filled with a second medium, wherein a moveable component which is displaceable in the longitudinal direction thereof and/or rotatable about the longitudinal direction thereof extends through the seal arrangement and wherein the seal arrangement comprises a sealing element which comprises a first sealing region that is sealing in relation to the first medium space and a second sealing region that is sealing in relation to the second medium space,
wherein the first sealing region comprises a first dynamic sealing section abutting against the moveable component and the second sealing region comprises a second dynamic sealing section abutting against the moveable component and at least one of the two dynamic sealing sections has at least two sealing lips.

Such a seal arrangement is known from the state of the art.

In particular, it is known to use a seal arrangement for the purposes of sealing the piston of a high-pressure pump used for the direct injection of petrol into the cylinders of an Otto engine, wherein the sealing element of said seal arrangement comprises a first dynamic sealing section with two sealing lips for sealing in relation to the petrol side of the system and a second dynamic sealing section with a memory sealing lip for sealing in relation to the engine oil side of the system.

Hereby, there is provided a spring element which biases the first dynamic sealing section having the two sealing lips against the piston bearing surface of the piston. By contrast, the second dynamic sealing section having the memory sealing lip is not spring-loaded.

However, such a known seal arrangement has high leakage values especially when there is a large difference in pressure between the first medium space and the second medium space.

The object of the present invention is to produce a seal arrangement of the type mentioned hereinabove which ensures reliable sealing between the medium spaces whilst exhibiting very low leakage values over a longer period of use.

In accordance with the invention, this object is achieved in the case of a seal arrangement including the features indicated in the preamble of claim 1 in that each of the two sealing regions comprises at least one respective spring element which biases the dynamic sealing section of the respective sealing region against the moveable component.

Due to the biasing of the sealing lips of both dynamic sealing sections of the sealing element against the sealing surface of the moveable component, the effect is achieved that there is only a very small amount of leakage at both the first medium end and at the second medium end so that the sealing effect of the seal arrangement between the first medium space and the second medium space is significantly improved.

The first and/or the second medium is preferably a liquid. In particular, the first medium and the second medium can be of mutually differing liquids.

Of the two dynamic sealing sections of the sealing element, one has at least two sealing lips whilst the respective other one has at least one sealing lip.

In a preferred embodiment of the seal arrangement in accordance with the invention, provision is made for both dynamic sealing sections to each have at least two sealing lips.

A still better sealing effect is obtained if at least one of the dynamic sealing sections has at least three sealing lips.

For the purposes of achieving very low leakage values, it is particularly expedient if both dynamic sealing sections each have at least three sealing lips.

The sealing element is preferably ring-shaped and in particular, it is formed such as to be rotationally symmetrical with respect to the longitudinal direction of the moveable component.

In order to enable the sealing element to be inserted into the seal arrangement in both a starting position and in a position rotated through 180° with respect to the starting position, provision is preferably made for the sealing element to be formed such that it is substantially mirror-symmetrical with respect to a transverse central plane of the sealing element running perpendicularly to the longitudinal direction of the moveable component. The assembly of the seal arrangement is substantially simplified in this way.

In order to obtain additional guidance for the sealing element on the moveable component, it is of advantage if the sealing element comprises a central web which is arranged between the first dynamic sealing section and the second dynamic sealing section and abuts against the moveable component in the installed state of the seal arrangement.

In a preferred embodiment of the seal arrangement in accordance with the invention, provision is made for the first sealing region to comprise a first static sealing section arranged radially outwardly from the first dynamic sealing section.

Furthermore, provision is preferably made for the second sealing region to comprise a second static sealing section arranged radially outwardly from the second dynamic sealing section.

The first static sealing section and the second static sealing section preferably abut in sealing manner on a seal carrier into which the sealing element is inserted.

The static sealing sections may extend in the axial direction of the sealing element, i.e. in a direction running parallel to the longitudinal direction of the moveable component, to substantially the same extent as the appertaining dynamic sealing sections. In particular, the axial ends of the static sealing sections may be located at the same distance from a transverse central plane of the sealing element as the axial ends of the dynamic sealing sections.

However, as an alternative thereto, provision may be made for at least one static sealing section to project in the axial direction beyond the appertaining dynamic sealing section of the same sealing region. In this way, the effect can be achieved that the sealing element is only supported by means of the static sealing section concerned on a seal carrier into which the sealing element is inserted, and that it is not loaded when the sealing element is pressed into the seal carrier of the appertaining dynamic sealing section.

At least one static sealing section of the sealing element can be supported in the axial direction on a seal carrier or on another component of the seal arrangement.

The sealing element of the seal arrangement in accordance with the invention advantageously comprises a fluoropolymer material.

In particular, provision may be made for the sealing element to comprise a polytetrafluoroethylene (PTFE) or a modified polytetrafluoroethylene.

A "modified polytetrafluoroethylene" is to be understood as being a substance similar to PTFE wherein the molecular structure of the PTFE has been chemically modified in that yet another likewise perfluoridated monomer has been built into the molecular chain in addition to the tetrafluoroethylene so that the fluorine atoms of the PTFE are partially replaced by substituents.

The chemical composition and a process for the production of "modified PTFE" are described in EP 0 041 687 A1, EP 0 931 798 A1 or the U.S. Pat. No. 6,013,700 for example.

Such PTFE containing materials exhibit particularly good temperature and chemical resistances as well as good dry-running properties.

The sealing element can consist of polytetrafluoroethylene or of a modified polytetrafluoroethylene.

As an alternative thereto, provision may also be made for the sealing element to be formed from a polytetrafluoroethylene compound or from a modified polytetrafluoroethylene compound, i.e. from a mixture of a polytetrafluoroethylene or a modified polytetrafluoroethylene with one or more organic or inorganic fillers.

In order to enable any medium that has leaked past a sealing lip of the sealing element during a stroke of the moveable component to be temporarily accumulated and then be returned to the correct side for this medium during the return stroke of the moveable component, it is of advantage if at least one dynamic sealing section of the sealing element has at least one leakage storage space which is formed between two neighbouring sealing lips of the dynamic sealing section concerned.

Such a leakage storage space is preferably ring-shaped.

It is particularly expedient, if at least one dynamic sealing section of the sealing element has a plurality of leakage storage spaces which succeed one another in the longitudinal direction of the moveable component.

Hereby, all the leakage storage spaces of a dynamic sealing section can be substantially equally large.

However, as an alternative thereto, provision may also be made for the leakage storage spaces of the dynamic sealing section to be of different sizes in order to allow for the fact that the amount of leakage decreases from the axial ends of the sealing element towards the centre of the sealing element since the leakage media must pass an increasing number of sealing lips in order to approach the centre of the sealing element.

Leakage storage spaces of different sizes can be produced for example, in that the sealing lips which bound the leakage storage spaces are of different internal diameters in the manufacturing state of the sealing element. When assembling the seal arrangement, these sealing lips are then deformed in such a way that they have an internal diameter corresponding to the external diameter of the moveable component so that, in operation of the seal arrangement, the sealing lips abut in sealing manner against the sealing surface of the moveable component.

Preferably, provision is made for the size of the leakage storage spaces to decrease with increasing distance from a medium-space axial end of the sealing element.

This can be achieved, in particular, in that the internal diameter of the sealing lips which bound the leakage storage spaces increases with increasing distance from a medium-space end of the sealing element in the manufacturing state of the sealing element.

At least one sealing lip of the sealing element is preferably designed in such a way that it has two boundary surfaces which are inclined at different angles ($\alpha$, $\beta$) with respect to a plane running perpendicularly to the longitudinal direction of the moveable component.

Preferably thereby, that boundary surface which is oriented towards the nearest medium-space end of the sealing element is inclined at a smaller angle (a) with respect to the plane running perpendicularly to the longitudinal direction of the moveable component than that boundary surface which is oriented in the direction away from the nearest medium-space end of the sealing element. The effect achieved by this design of the sealing lip is that the leakage medium can only overcome the sealing lip with difficulty in a direction away from a medium-space end of the sealing element, but can easily be dragged back towards a medium-space end of the sealing element in the opposite direction.

The sealing lips of the sealing element of the seal arrangement in accordance with the invention may comprise sharply delimited sealing edges which abut against a sealing surface of the moveable component along a single line.

As an alternative thereto, provision may also be made for at least one dynamic sealing section of the sealing element to have at least one flattened sealing lip which is supported on the moveable component in the installed state of the seal arrangement by means of a supporting surface aligned substantially in parallel with the longitudinal direction of the moveable component. Due to this supporting surface which is of greater space compared with a sharp sealing lip, the specific surface pressure on the sealing lip concerned is decreased and the bearing portion of the sealing lip is increased when new, whereby wear of the sealing lip is reduced and the life span of the sealing element is extended.

The wear on the sealing lip is reduced due to the flattened form of the sealing lip especially when one of the media adjoining the sealing element contains dirt particles (for example, in the case of a dirty oil).

In order to keep dirt particles from at least one of the two medium spaces, from a medium space filled with engine oil for example, away from the sealing lips of the sealing element, it is expedient if at least one dynamic sealing section of the sealing element has a stripping lip in addition to the sealing lips.

In particular, provision may be made for the stripping lip to project in the axial direction beyond a static sealing section of the same sealing region of the sealing element.

The sealing element can be of symmetrical design if both dynamic sealing sections of the sealing element each comprise a stripping lip in addition to the sealing lips. In this case, the orientation of the sealing element relative to the moveable component becomes irrelevant so that the sealing element can be installed in two positions which are rotated through 180° with respect to each other, this thereby simplifying the assembly of the seal arrangement in accordance with the invention.

In a preferred embodiment of the seal arrangement in accordance with the invention, provision is made for at least one stripping lip of the sealing element to be in the form of a memory stripping lip.

Such a stripping lip is biased against the sealing surface of the moveable component by means of a memory effect of the material used for the stripping lip, in particular, a PTFE or a PTFE compound material.

This memory effect is brought about by virtue of the fact that the memory stripping lip is initially produced with an internal diameter which is smaller than the external diameter of the moveable component by means of a machining process, and the memory stripping lip is subsequently deformed at ambient temperature or at a higher temperature in such a way that the moveable component can be passed therethrough. When the seal arrangement heats up during the operation thereof, the material of the memory stripping lip deforms back into its original shape. Due to this memory effect, the memory stripping lip is thus biased against the sealing surface of the moveable component and is continually urged towards the moveable component in the course of the wear on the memory stripping lip occurring in operation of the seal arrangement, this thereby ensuring that the memory stripping lip always produces an adequate stripping effect.

The average pressure difference between the first medium space and the second medium space in operation of the seal arrangement preferably amounts to at least approximately 5 bar, and especially to at least approximately 10 bar. Even at such high average pressure differences, the seal arrangement in accordance with the invention ensures reliable sealing between the two medium spaces, with very small leakage values.

In the event of pulsating pressures, the maximum difference in pressure between the first medium space and the second medium space can be up to approximately 15 bar above the average pressure difference.

Preferably, the maximum difference in pressure between the medium spaces amounts to at least approximately 20 bar.

The seal arrangement in accordance with the invention is particularly suitable for use in a high-pressure pump, and in particular, for use in a high-pressure pump for injecting a fuel into a combustion engine.

With the aid of such a high-pressure pump for example, the fuel (petrol) is injected directly into the cylinders of the combustion engine for the purposes of increasing the performance of Otto engines in a manner similar to that of the common rail technique used in diesel engines. A high-pressure piston pump is used for producing the high petrol pressure needed for this purpose. The pistons in this high-pressure pump are driven by the cam shaft using special cams and are restored with the aid of spring elements. The seal arrangement in accordance with the invention can be used for sealing the petrol end with respect to the cam shaft end which is filled with engine oil.

It is due to the small petrol leakage values of the seal arrangement in accordance with the invention that an excessive amount of petrol is prevented from entering the engine oil, something which could cause thinning of the oil thus leading to breakdown of the engine.

Likewise, the seal arrangement in accordance with the invention prevents an excessive amount of engine oil from entering the petrol, something which could lead to blockages in the filters and jets and thus likewise cause breakdown of the engine.

Furthermore, the seal arrangement in accordance with the invention not only enables petrol that is kept under pressure to be sealed but also enables the almost pressure-free oil to be stripped from the cam shaft in an efficient manner.

Due to the increased number of sealing lips which abut against the moveable component for sealing purposes, the wear on the sealing lips and sealing edges is also reduced so that the seal arrangement in accordance with the invention is capable of being used over a longer period of time.

Further features and advantages of the invention form the subject matter of the following description and the graphical illustration of exemplary embodiments.

Figure 2:
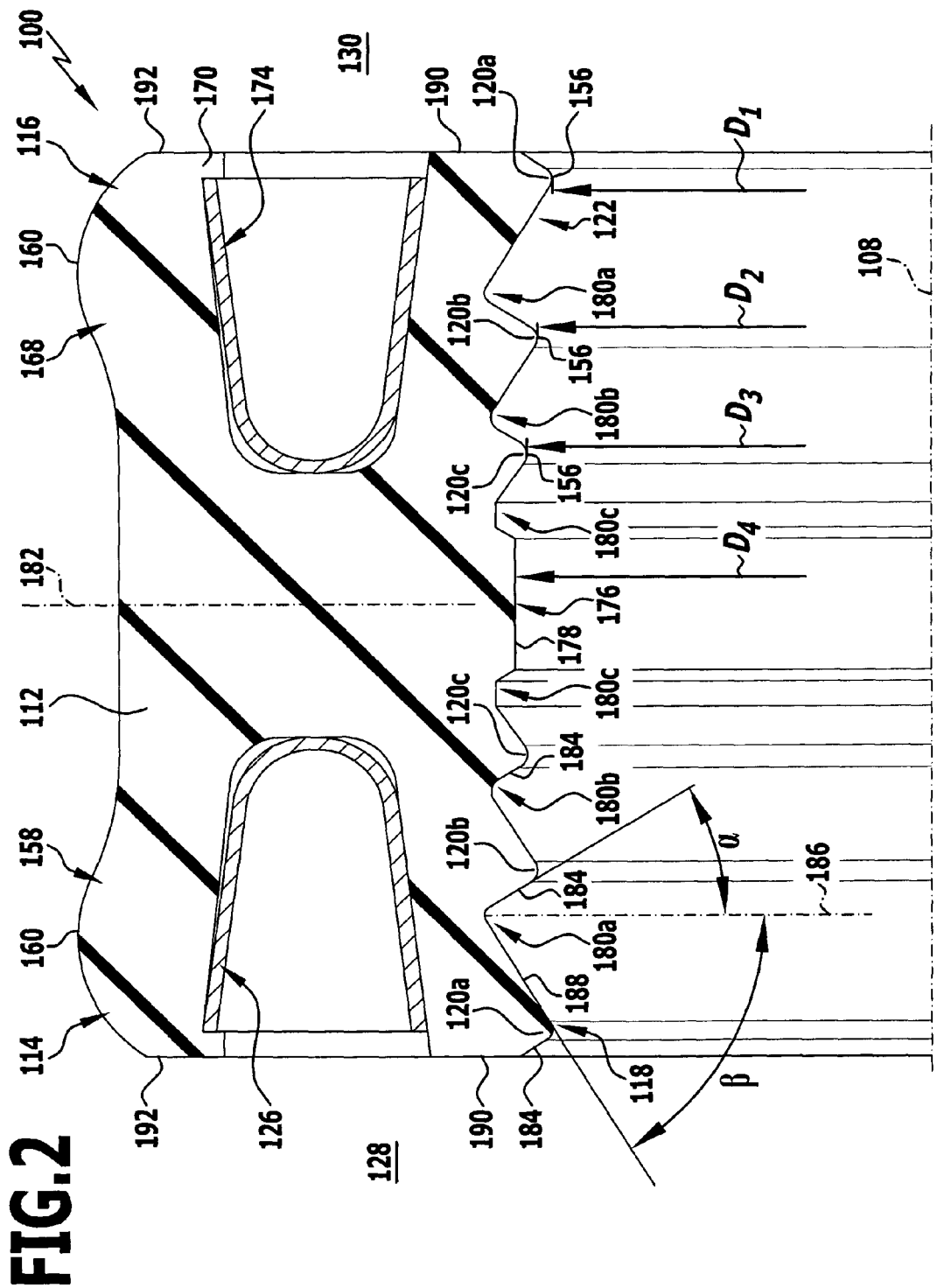
Figure 3:
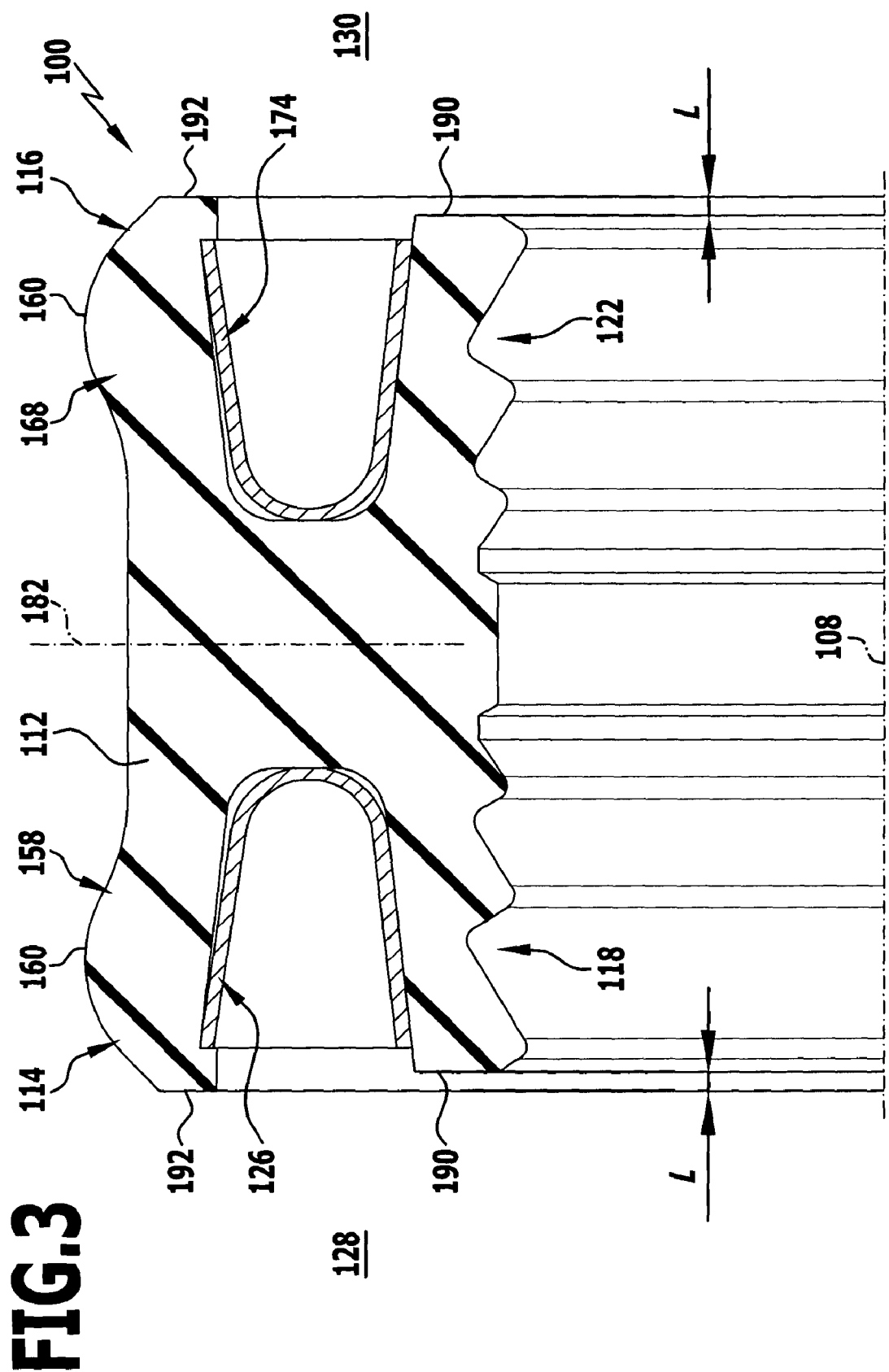
Figure 4:
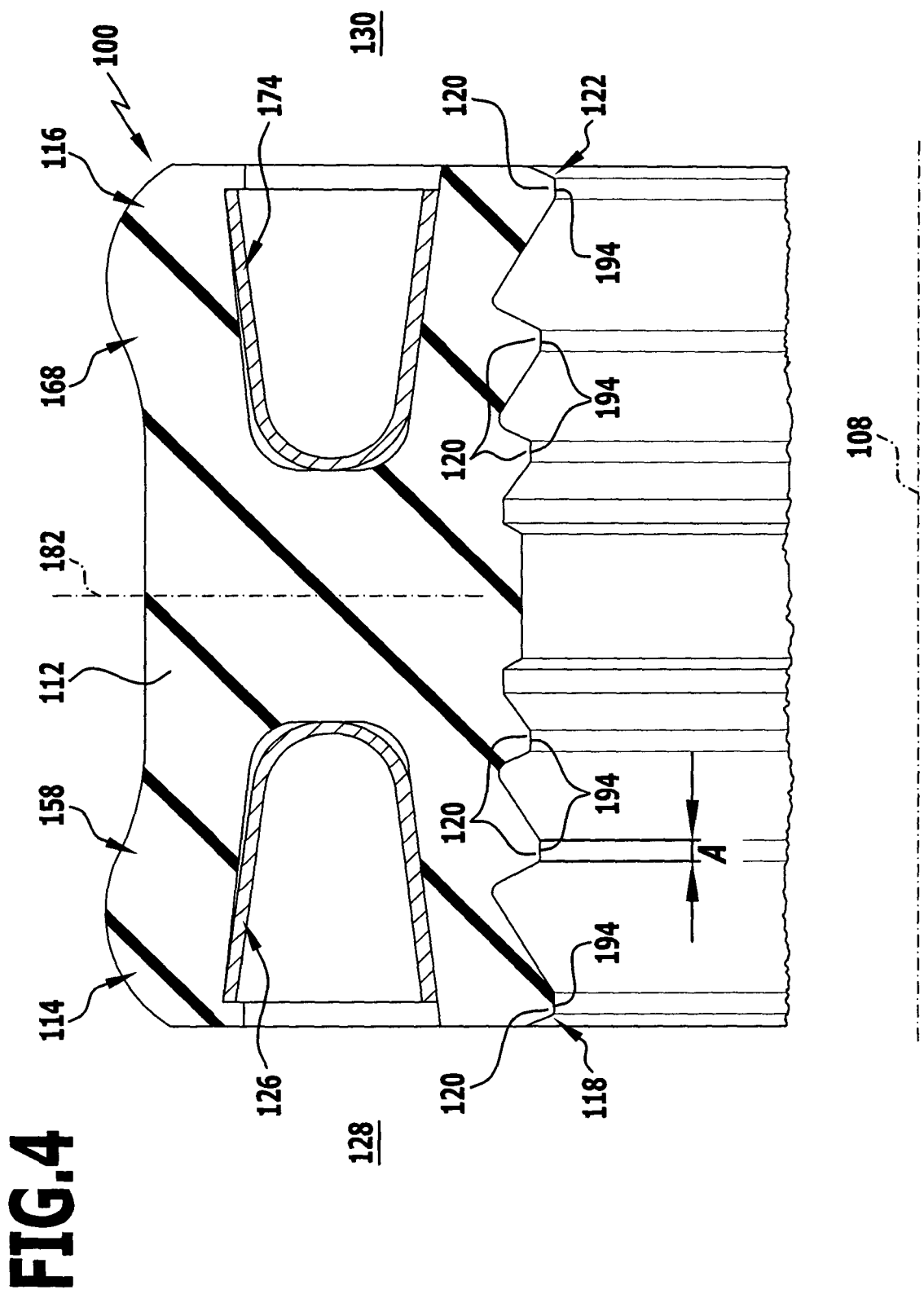
Figure 5:
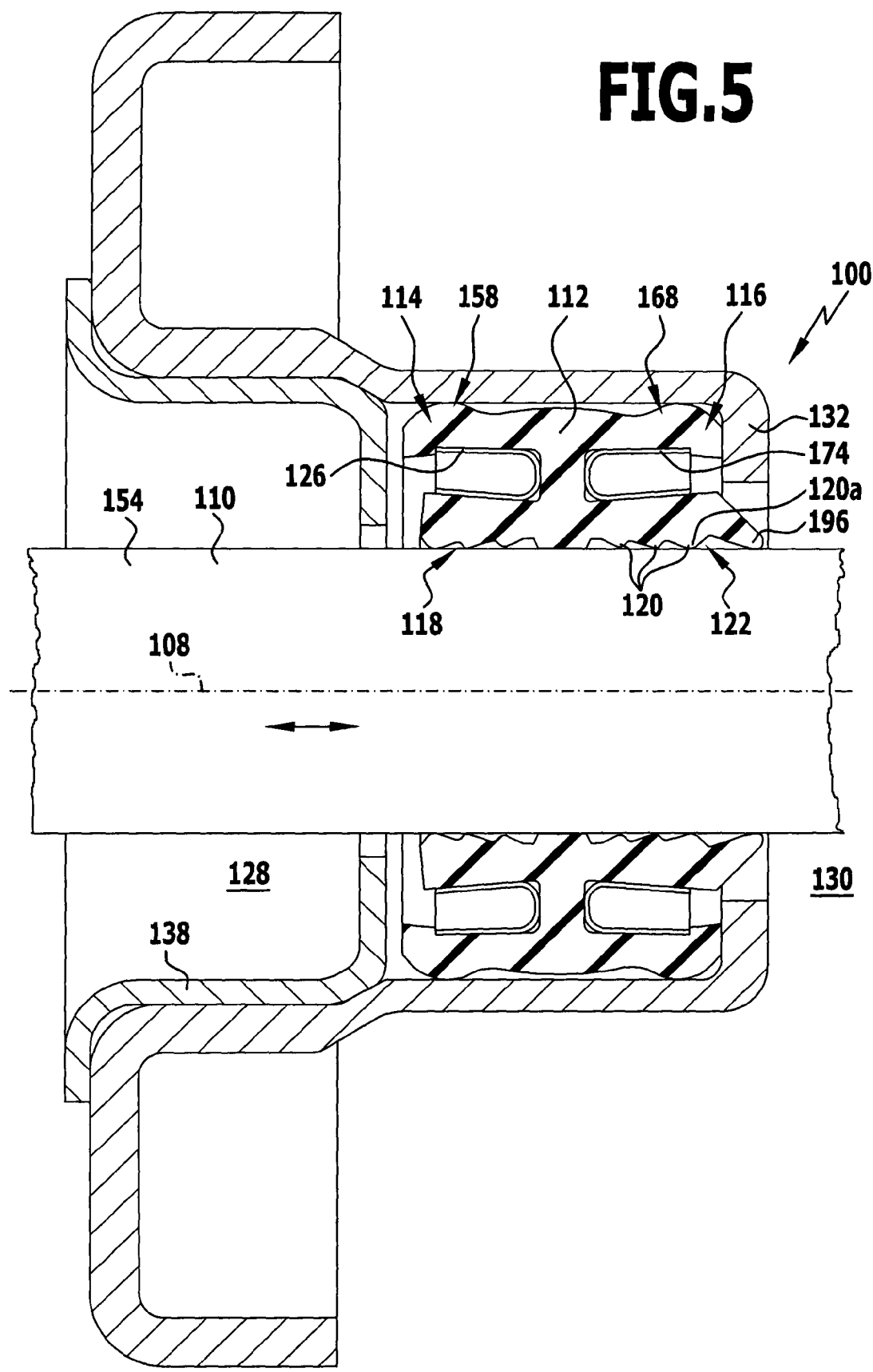
Figure 6:
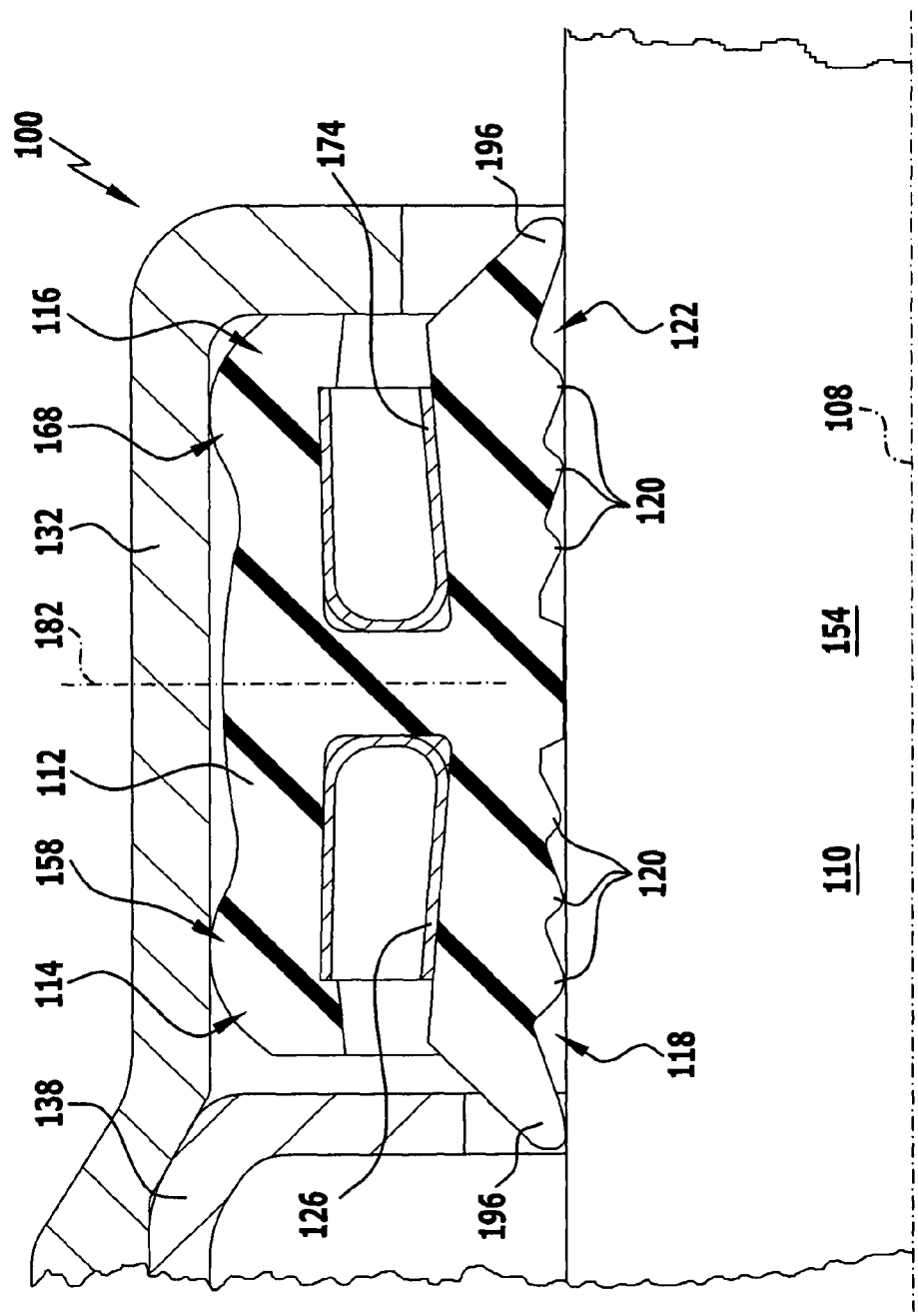
Figure 7:
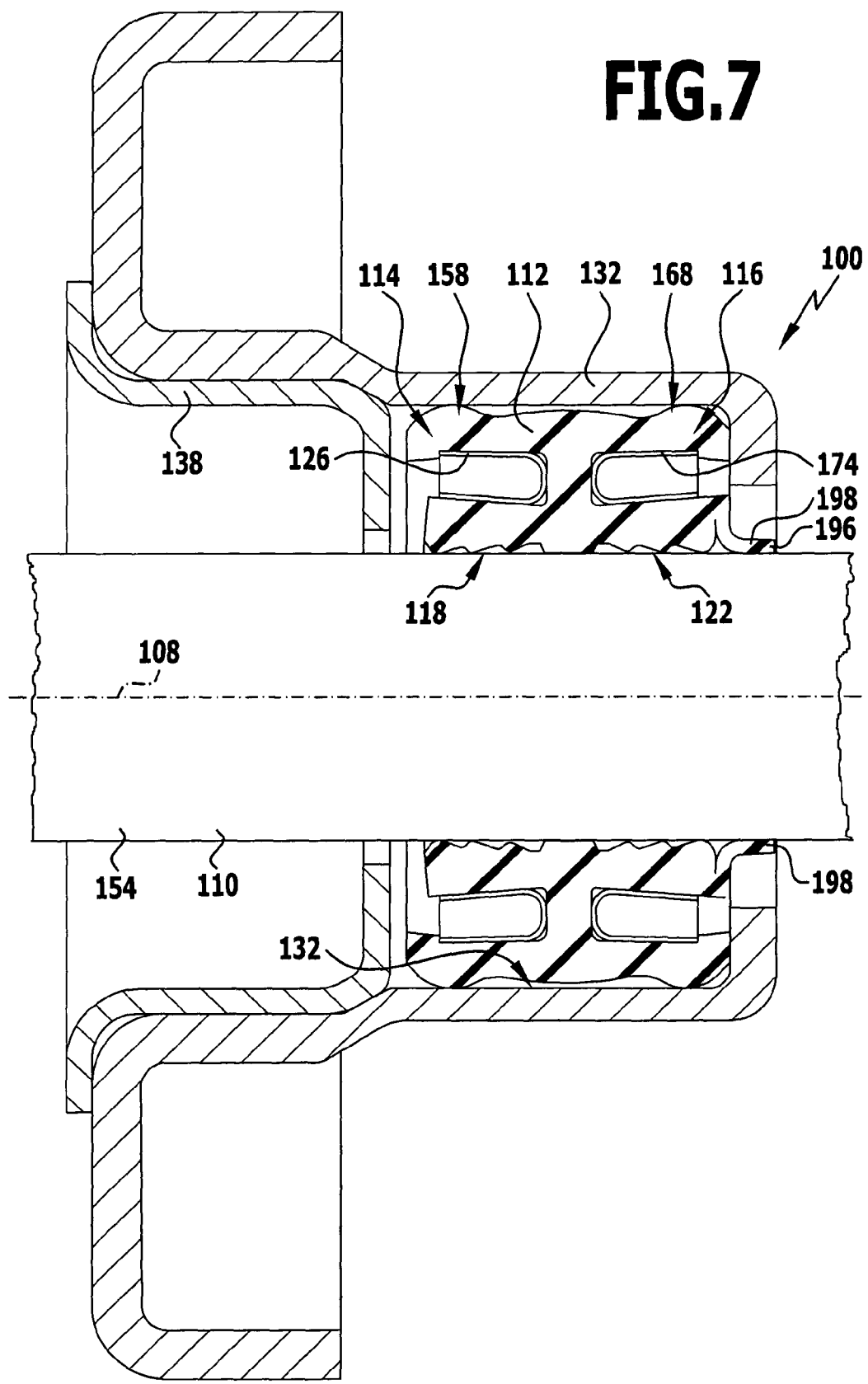
Figure 8:
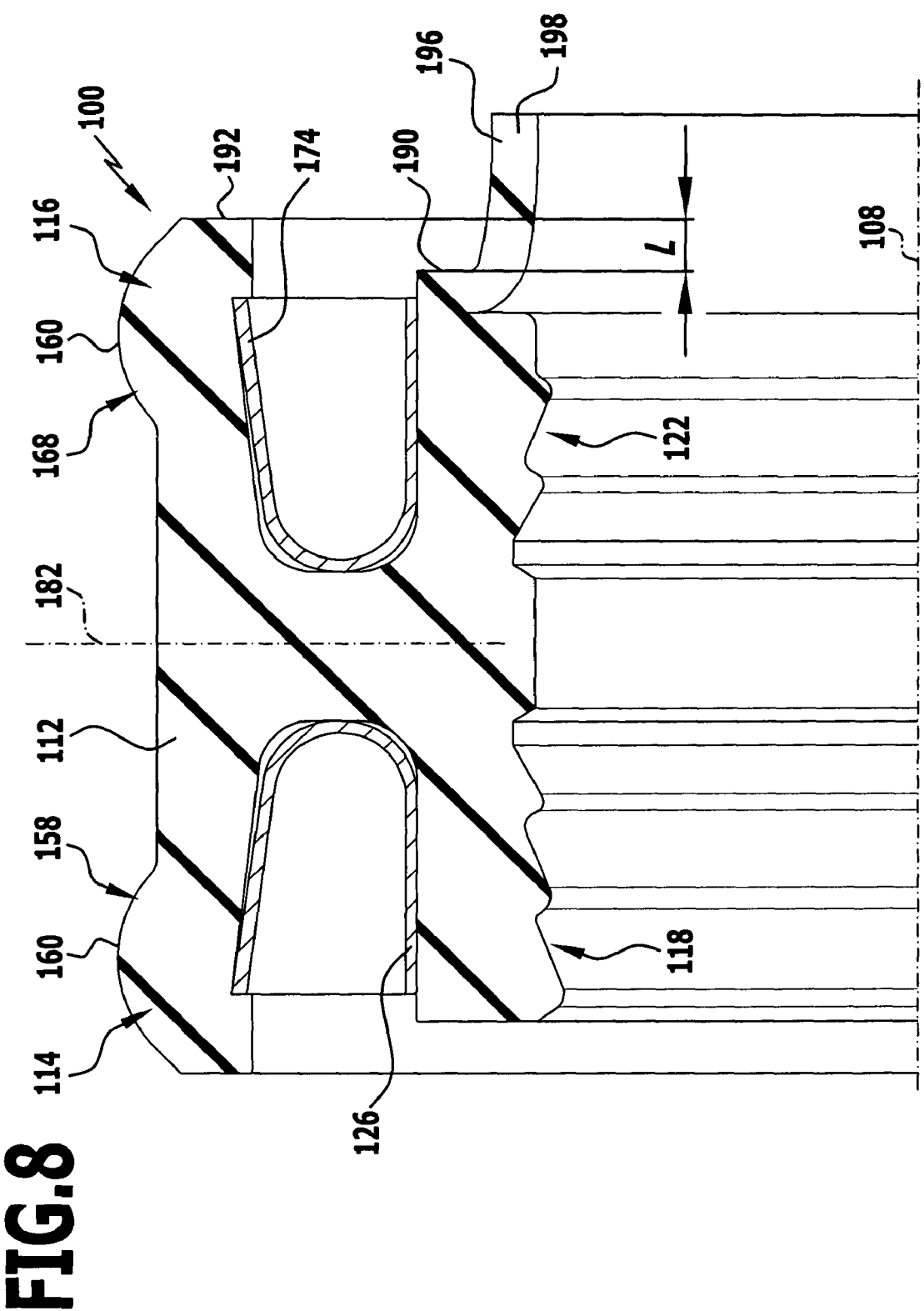

In the drawings:

FIG. 1 shows a schematic longitudinal section through a first embodiment of a seal arrangement especially for a high-pressure pump used for direct injection of petrol in the assembled state thereof, wherein a sealing element of the seal arrangement comprises a first sealing region that is sealing in relation to a first medium space and includes a first dynamic sealing section which has three sealing lips and is biased against a longitudinally displaceable piston by means of a spring element, and a second sealing region that is sealing in relation to a second medium space and includes a second dynamic sealing section which likewise has three sealing lips and is biased against the piston by means of a spring element;

FIG. 2 a schematic longitudinal section through the sealing element of a second embodiment of a seal arrangement in which the sealing lips of the dynamic sealing sections have different internal diameters;

FIG. 3 a schematic longitudinal section through the sealing element of a third embodiment of a seal arrangement in which the sealing lips of the dynamic sealing sections have different internal diameters and wherein static sealing sections respectively associated with the dynamic sealing sections project in the axial direction beyond the dynamic sealing sections;

FIG. 4 a schematic longitudinal section through the sealing element of a fourth embodiment of a seal arrangement in which the dynamic sealing sections have flattened sealing lips;

FIG. 5 a schematic longitudinal section through a fifth embodiment of a seal arrangement in which the sealing element is provided with an additional stripping lip at the second sealing region;

FIG. 6 a schematic cross section through the sealing element of a sixth embodiment of a seal arrangement in which both sealing regions are provided with additional stripping lips;

FIG. 7 a schematic longitudinal section through a seventh embodiment of a seal arrangement in which the second sealing region of the sealing element is provided with a stripping lip having a memory effect; and FIG. 8 a schematic longitudinal section through the sealing element of an eighth embodiment of a seal arrangement in which the first dynamic sealing section has three sealing lips and the second dynamic sealing section has two sealing lips and a stripping lip with a memory effect.

Similar or functionally equivalent elements are designated by the same reference symbols in each of the Figures.

A seal arrangement for a high-pressure pump which bears the general reference 100 and is illustrated in FIG. 1 serves for sealing between a first medium space 128 which is filled with a liquid, fuel and in particular petrol for example, and a second medium space 130 which is filled with another liquid, with engine oil for example.

The seal arrangement 100 comprises a seal carrier 132 having a central substantially hollow cylindrical seal seating region 134 and an outer ring-shaped edge region 136 surrounding the seal seating region 134.

A sleeve 138 is pressed into the seal carrier 132, the central end wall 140 of said sleeve together with the seal seating region 134 of the seal carrier 132 bounding a seal space 142 in which a ring-shaped sealing element 112 is arranged.

A first region 144 of the seal space 142 is connected via a through opening 146 in the end wall 140 of the sleeve 138 to the first medium space 128 so that this first region of the seal space 144 is filled with the first medium, the fuel for example.

A second region 148 of the seal space 142 is connected via a through opening 150 in a central end wall 152 of the seal seating region 134 of the seal carrier 132 to the second medium space 130 and is thus filled with the second medium, with engine oil for example.

The first region 144 and the second region 148 of the seal space 142 are separated from each other in substantially fluid-tight manner by a ring-shaped sealing element 112 arranged in the seal space 142.

Furthermore, a substantially cylindrical piston 110, which is displaceable along the longitudinal axis 108 thereof and the peripheral surface of which forms a piston bearing surface 154, extends through the through opening 146 in the end wall 140 of the sleeve 138, through the central ring opening of the sealing element 112 in the seal space 142 and through the through opening 150 in the end wall 152 of the seal carrier 132 from the first medium space 128 into the second medium space 130.

The sealing element 112 comprises a first sealing region 114 which is sealing with respect to the first medium space 128, and a second sealing region 116 which is sealing with respect to the second medium space 130.

The first sealing region 114 comprises a first dynamic sealing section 118 which comprises three ring-shaped closed sealing lips 120 that are formed such as to be coaxial with the longitudinal axis 108 of the piston 110 which itself coincides with the longitudinal axis of the sealing element 112, said sealing lips succeeding one another in the direction of the longitudinal axis 108 and each having a respective sharp sealing edge 156 which abuts against the piston bearing surface 154.

Furthermore, the first sealing region 114 comprises a first static sealing section 158 which is arranged radially outwardly of the first dynamic sealing section 118 and includes a sealing lip 160 which abuts in sealing manner on the inner surface of the section 162 of the seal carrier 132 running parallel to the longitudinal axis 108.

The first static sealing section 158 is separated from the first dynamic sealing section 118 by an annular groove 164 which is provided in the sealing element 112 and is open towards one axial end of the sealing element 112 and in which there is arranged a first ring-shaped closed spring element 126 the mutually opposite legs 166a and 166b of which respectively bias the first dynamic sealing section 118 against the piston bearing surface 154 and the first static sealing section 158 against the section 162 of the seal carrier 132 in resilient manner.

The second sealing region 116 of the sealing element 112 comprises a second dynamic sealing section 122 which in like manner to the first dynamic sealing section 118 has three mutually spaced ring-shaped closed sealing lips 120 that are formed such as to be coaxial with the longitudinal axis 108 and succeed one another along the longitudinal axis 108. These sealing lips 120 abut on the piston bearing surface 154 by means of a respective sharp sealing edge 156.

Furthermore, the second sealing region 116 of the sealing element 112 comprises a second static sealing section 168 which is arranged radially outwardly of the second dynamic sealing section 122 and includes a sealing lip 160 which abuts on the inner surface of the section 162 of the seal carrier 132 in sealing manner.

Moreover, the second static sealing section 168 projects in the axial direction, i.e. in the direction of the longitudinal axis 108, beyond the end of the second dynamic sealing section 122, whereby the projecting region forms a shoulder 170 with the aid of which the sealing element 112 is supported on the end wall 152 of the seal carrier 132 under the influence of an increased pressure in the first medium space 128.

The difference in pressure between the first medium space 128 and the second medium space 130 amounts to approximately 12 bar for example.

The second static sealing section 168 is separated from the second dynamic sealing section 122 by an annular groove 172 which is formed in the sealing element 112 and is open towards one axial end of the sealing element 112 and in which there is arranged a second ring-shaped spring element 174 the legs 166a and 166b of which respectively bias the second dynamic sealing section 122 against the piston bearing surface 154 and the second static sealing section 168 against the section 162 of the seal carrier 132 in resilient manner.

Between the first dynamic sealing section 118 and the second dynamic sealing section 122, there is formed a central web 176 which protrudes radially inwardly towards the piston 110 and has a substantially cylindrical supporting surface 178 which abuts on the piston bearing surface 154 over a large surface space so that the sealing element 112 is guided thereby on the piston 110.

Between two of the respective mutually neighbouring sealing lips 120 of the dynamic sealing sections 118, 122 and also between the respective sealing lip 120 located closest to the central web 176 and the central web 176 itself, there is formed a respective ring-shaped leakage storage space 180 which is coaxial with the longitudinal axis 108, whereby the successive leakage storage spaces 180 are separated from each other by the intermediary sealing edges 156 or by the central web 176.

Due to the fact that three sealing lips 120 which abut against the piston bearing surface 154 by means of their sealing edges 156 are respectively provided in the first dynamic sealing section 118 and in the second dynamic sealing section 122, the leakage of the first medium into the second medium space 130 and the leakage of the second medium into the first medium space 128 is significantly reduced in comparison with the known seal arrangements.

Leakage liquid from the first medium space 128 is stored in the leakage storage spaces 180 of the first dynamic sealing section 118 and dragged back into the first medium space 128 during the return stroke of the piston 110.

Likewise, leakage liquid from the second medium space 130 is collected in the leakage storage spaces 180 of the second dynamic sealing section 122 and dragged back again into the second medium space 130 during the return stroke of the piston.

All six leakage storage spaces 180 of the sealing element 112 (three respective leakage storage spaces 180 in the first dynamic sealing section 118 and in the second dynamic sealing section 122) are of substantially the same size.

The sealing element 112 is preferably in one-piece form and is made of a fluoropolymer material, for example, from PTFE or from a PTFE compound.

The sealing element 112 can be formed, in particular, from a PTFE compound which contains up to 20 percent by weight of carbon fibres and the abut of PTFE.

The sealing element 112 can be made from a hollow cylindrical blank of the sintered PTFE compound by a machining process.

The spring elements 126 and 174 are preferably in the form of metallic annular springs having a U-, V- or C-shaped cross section.

The sealing element 112 is substantially mirror-symmetrical with respect to a transverse central plane 182 running perpendicularly to the longitudinal axis 108 thereof. In this way, the effect is achieved that the orientation of the sealing element 112 relative to the piston 110 does not play a role and the sealing element 112 can thus also be inserted into the seal carrier 132 in a position rotated through 180°.

The shoulders 170 of the static sealing sections 158 and 168 extend over a part of the respective neighbouring annular groove 164 and a respective leg 166b of the spring element 126 and 174 arranged therein so that the spring elements 126, 174 are retained in the respective annular groove 164 by the shoulders 170.

A second embodiment of a seal arrangement 100 that is illustrated in FIG. 2 differs from the first embodiment illustrated in FIG. 1 in that the leakage storage spaces 180 of each dynamic sealing section 118, 122 are of different sizes in the second embodiment, whereby the size of the leakage storage spaces 180 decreases with increasing distance from the medium-space axial ends of the sealing element 112 so that the leakage storage spaces 180a that are closest to the axial ends of the sealing element 112 have a greater volume than the neighbouring leakage storage spaces 180b located closer to the transverse central plane 182 of the sealing element 112 and these in turn have a greater volume than the leakage storage spaces 180c that are located closest to the transverse central plane 182.

Due to the size of the leakage storage spaces 180 decreasing towards the transverse central plane 182 of the sealing element 112, account is taken of the fact that the amount of leakage decreases from the axial ends of the sealing element 112 towards the transverse central plane 182, since the leakage liquid must pass an increasing number of sealing lips 120 in order to reach the leakage storage spaces 180 located more closely to the transverse central plane 182.

The different sizes of the leakage storage spaces 180 are obtained in that the sealing lips bounding the leakage storage spaces 180 and the central web 176 have different internal diameters in the manufacturing state of the sealing element 112.

As can be seen from FIG. 2, the internal diameter D of the sealing lips 120 increases with increasing distance from the axial ends of the sealing element 112 so that the internal diameter $D_1$ at the sealing edge 156 of the outermost sealing lips 120a located closest to the axial ends of the sealing element 112 is smaller than the internal diameter $D_2$ at the sealing edge 156 of the middle sealing lips 120b located more closely to the transverse central plane 182 of the sealing element 112, and their internal diameter $D_2$ is again smaller than the internal diameter $D_3$ at the sealing edge 156 of the inner sealing lips 120c that are located closest to the transverse central plane 182 of the sealing element 112. The internal diameter $D_3$ of the inner sealing lip 120c is in turn smaller than the internal diameter $D_4$ of the supporting surface 178 of the central web 176.

With the introduction of the piston 110 into the ring opening of the sealing element 112, the dynamic sealing sections 118, 122 are deformed in such a way that the sealing lips 120 are all of the same internal diameter at their sealing edges 156, this diameter corresponding to the external diameter of the piston 110 so that the sealing edges 156 all abut against the piston bearing surface 154 when the seal arrangement is in operation.

In order to improve the stripping effect of the dynamic sealing sections 118, 122 and to facilitate the reverse transportation of the leakage liquid during the return stroke of the piston 110, the outwardly oriented boundary surfaces 184, i.e. those oriented towards the nearest axial end of the sealing element 112 have a differing angle of inclination (a) with respect to a plane 186 running perpendicularly to the longitudinal axis 108 than the inwardly oriented boundary surfaces 188 of the sealing lips 120, i.e. those oriented towards the transverse central plane 182 of the sealing element 112.

As can be seen from FIG. 2, the outwardly oriented boundary surfaces 184 are steeper than the inwardly oriented boundary surfaces 188, i.e. the outwardly oriented boundary surfaces 184 are inclined at an angle a with respect to the plane 186 running perpendicularly to the longitudinal axis 108, this angle being smaller than the angle β at which the inwardly oriented boundary surfaces 188 of the sealing lips 120 are inclined to this plane 186.

Due to this design of the sealing lips 120, the effect is achieved that the leakage liquid can only overcome the sealing lips 120 with difficulty in a direction away from an axial end of the sealing element 112 towards the transverse central plane 182 of the sealing element 112, but can easily be dragged back in the opposite direction away from the transverse central plane 182 towards an axial end of the sealing element 112.

Moreover, the stripping effect from these surfaces is improved by the steep design of the outwardly pointing boundary surfaces 184.

These different angles of inclination α and β of the respective boundary surfaces 184 and 188 of the sealing lips 120 are realized above all in the embodiments of seal arrangements 100 illustrated in FIGS. 1 to 8.

In contrast to the first embodiment illustrated in FIG. 1, the static sealing sections 158 and 168 of the sealing element 112 of the second embodiment do not project beyond the respectively associated first dynamic sealing section 118 and second dynamic sealing section 122, but rather, they end at the same distance from the transverse central plane 182 as the respectively associated dynamic sealing section 118 and 122.

In all other respects, the second embodiment of a seal arrangement 100 that is illustrated in FIG. 2 agrees in regard to the construction and functioning thereof with the first embodiment illustrated in FIG. 1 and insofar reference is made to the preceding description thereof.

A third embodiment of a seal arrangement 100 that is illustrated in FIG. 3 differs from the second embodiment illustrated in FIG. 2 in that the axial ends 190 of the dynamic sealing sections 118 and 122 are set back in relation to the axial ends 192 of the respectively associated static sealing sections 158, 168 by a distance L with respect to the transverse central plane 182 of the sealing element 112.

This offers the advantage that the dynamic sealing sections 118 and 122 are not loaded when pressing the sealing element 112 into the seal carrier 132.

In all other respects, the third embodiment of a seal arrangement 100 that is illustrated in FIG. 3 agrees in regard to the construction and functioning thereof with the second embodiment illustrated in FIG. 2 and insofar reference is made to the preceding description thereof.

A fourth embodiment of a seal arrangement 100 that is illustrated in FIG. 4 differs from the second embodiment illustrated in FIG. 2 in that the sealing lips 120 of the dynamic sealing sections 118 and 122 do not have sharp sealing edges 156, but instead, are flattened and abut flatly against the piston bearing surface 154 by means of substantially cylindrical supporting surfaces 194 which respectively extend in parallel with the longitudinal axis 108 over a distance A.

Due to this supporting surface being larger compared with a sharp sealing edge 156, the specific surface pressure at each of the sealing lips 120 is decreased and the supporting portion of the sealing lips 120 is increased when new, whereby the wear on the sealing lips is reduced and the life span of the sealing element 112 is extended.

In all other respects, the fourth embodiment of a seal arrangement 100 that is illustrated in FIG. 4 agrees in regard to the construction and functioning thereof with the second embodiment illustrated in FIG. 2 and insofar reference is made to the preceding description thereof.

A fifth embodiment of a seal arrangement 100 that is illustrated in FIG. 5 differs from the third embodiment illustrated in FIG. 3 in that, in addition to the three sealing lips 120, the second dynamic sealing section 122 of the sealing element 112 is provided with a stripping lip 196 which projects in the axial direction beyond the second static sealing section 168 and abuts against the piston bearing surface 154.

Due to this additional stripping lip 196, dirt particles from the second medium, from the engine oil for example, are kept away from the sealing lips 120 of the second dynamic sealing section 122.

As an alternative thereto, provision could also be made for the sealing lip 120a of the second dynamic sealing section 122 that is located closest to the axial end of the sealing element 112 to be dispensed with and for a stripping lip 196 to be provided instead.

In all other respects, the fifth embodiment of a seal arrangement 100 that is illustrated in FIG. 5 agrees in regard to the construction and functioning thereof with the third embodiment illustrated in FIG. 3 and insofar reference is made to the preceding description thereof.

A sixth embodiment of a seal arrangement 100 that is illustrated in FIG. 6 differs from the fifth embodiment illustrated in FIG. 5 in that the sealing element 112 is such that it is mirror-symmetrical with respect to the transverse central plane 182 thereof and thus, in addition to the respective three sealing lips 120, it also has a respective stripping lip 196 on each of its dynamic sealing sections 118, 122 and this stripping lip projects in the axial direction beyond the respectively associated static sealing section 158 and 168.

Due to the symmetry of the sealing element 112 with respect to the transverse central plane 182 thereof, it is ensured that the sealing element 112 can also be inserted into the seal carrier 132 at a position rotated through 180°, this thereby simplifying the assembly of the seal arrangement 100.

In all other respects, the sixth embodiment of a seal arrangement 100 that is illustrated in FIG. 6 agrees in regard to the construction and functioning thereof with the fifth embodiment illustrated in FIG. 5 and insofar reference is made to the preceding description thereof.

A seventh embodiment of a seal arrangement 100 that is illustrated in FIG. 7 differs from the fifth embodiment illustrated in FIG. 5 in that the additional stripping lip 196 of the second dynamic sealing section 122 is in the form of a memory stripping lip 198, i.e. it is in the form of a stripping lip which is biased against the piston bearing surface 154 by a memory effect of the fluoropolymer material being used, in particular, a PTFE or a PTFE compound material.

This memory effect comes into being due to the fact that when the memory stripping lip 198 is first being produced it is subjected to a machining process so as have an internal diameter which is smaller than the external diameter of the piston 110, and the memory stripping lip 198 is subsequently deformed at ambient temperature or at a higher temperature in such a manner that the piston 110 can be passed therethrough. When the seal arrangement 100 heats up during operation of the high-pressure pump, the PTFE-containing material of the memory stripping lip 198 deforms back to its original shape. Thus, due to this so-called "plastic memory effect", the memory stripping lip 198 is biased against the piston bearing surface 154 and is continually readjusted against the piston 110 in the course of wearing of the memory stripping lip 198 which occurs when the seal arrangement 100 is in operation, this thereby ensuring that the memory stripping lip 198 always produces an adequate stripping effect.

In all other respects, the seventh embodiment of a seal arrangement 100 that is illustrated in FIG. 7 agrees in regard to the construction and functioning thereof with the fifth embodiment illustrated in FIG. 5 and insofar reference is made to the preceding description thereof.

An eighth embodiment of a seal arrangement 100 that is illustrated in FIG. 8 differs from the seventh embodiment illustrated in FIG. 7 in that the sealing lip 120a of the second dynamic sealing section 122 nearest the axial end has been dispensed with and thus the second dynamic sealing section 122 has been shortened in such a way that its axial end 190 has been set back in relation to the axial end 192 of the second static sealing section 168 by the distance L, and as a result, the second dynamic sealing section is not loaded when the sealing element 112 is pressing into the seal carrier 132.

In all other respects, the eighth embodiment of a seal arrangement 100 that is illustrated in FIG. 8 agrees in regard to the construction and functioning thereof with the seventh embodiment illustrated in FIG. 7 and insofar reference is made to the preceding description thereof.

The invention claimed is:

1. A seal arrangement for sealing between a first medium space filled with a first medium and a second medium space filled with a second medium, wherein a moveable component, which is displaceable in the longitudinal direction thereof and/or rotatable about the longitudinal direction thereof, extends through the seal arrangement in an installed state of the seal arrangement and wherein the seal arrangement comprises a sealing element which comprises a first sealing region that is sealing in relation to the first medium space and a second sealing region that is sealing in relation to the second medium space,
   wherein the first sealing region comprises a first dynamic sealing section abutting against the moveable component in the installed state of the seal arrangement and the second sealing region comprises a second dynamic sealing section abutting against the moveable component in the installed state of the seal arrangement and at least one of the two dynamic sealing sections has at least two sealing lips, wherein each of the two sealing regions comprises at least one respective spring element which biases the dynamic sealing section of the respective sealing region against the moveable component in the installed state bf the seal arrangement,
   wherein the sealing element comprises a central web which is arranged between the first dynamic sealing section and the second dynamic sealing section and abuts a against the moveable component in the installed state of the seal arrangement,
   wherein at least one dynamic sealing section of the sealing element has a plurality of leakage storage spaces which are formed between two respective mutually neighboring sealing lips or between the respective sealing lip located closest to the central web and the central web itself,
   wherein the leakage storage spaces of the at least one dynamic sealing section are of different sizes,
   wherein the size of the leakage storage spaces of the at least one dynamic sealing section decreases with increasing distance from a medium-space end of the at least one dynamic sealing section, and
   wherein the internal diameter of the sealings which bound he leakage storage spaces increases with increasing distance from the medium-space end of the at least one dynamic sealing section in the uninstalled state of the seal arrangement.

2. A seal arrangement in accordance with claim 1, wherein both dynamic sealing sections each have at least two sealing lips.

3. A seal arrangement in accordance with claim 1, wherein at least one of the dynamic sealing sections has at least three sealing lips.

4. A seal arrangement in accordance with claim 3, wherein both dynamic sealing sections each have at least three sealing lips.

5. A seal arrangement in accordance with claim 1, wherein the sealing element is formed such that it is substantially mirror-symmetrical with respect to a transverse central plane of the sealing element running perpendicularly to the longitudinal direction of the moveable component.

6. A seal arrangement in accordance with claim 1, wherein the first sealing region comprises a first static sealing section arranged radially outwardly of the first dynamic sealing section.

7. A seal arrangement in accordance with claim 6, wherein the seal arrangement comprises a seal carrier against which at least one static sealing section of the sealing element abuts.

8. A seal arrangement in accordance with claim 6, wherein at least one static sealing section projects in the axial direction beyond the appertaining dynamic sealing section of the same sealing region.

9. A seal arrangement in accordance with claim 6, wherein at least one static sealing section of the sealing element is supported in the axial direction on a seal carrier or on another component of the seal arrangement.

10. A seal arrangement in accordance with claim 1, wherein the second sealing region comprises a second static sealing section arranged radially outwardly of the second dynamic sealing section.

11. A seal arrangement in accordance with claim 1, wherein the sealing element comprises a fluoropolymer material.

12. A seal arrangement in accordance with claim 11, wherein the sealing element comprises a polytetrafluoroethylene or a modified polytetrafluoroethylene.

13. A seal arrangement in accordance with claim 12, wherein the sealing element is formed from a polytetrafluoroethylene compound or from a modified polytetrafluoroethylene compound.

14. A seal arrangement in accordance with claim 1, wherein the at least one leakage storage space is ring-shaped.

15. A seal arrangement in accordance with claim 1, wherein the sealing lips which bound the leakage storage spaces are of different internal diameters in the manufacturing phase of the sealing element.

16. A seal arrangement in accordance with claim 1, wherein at least one sealing lip of the sealing element has two boundary surfaces which are inclined at different angles with respect to a plane running perpendicularly to the longitudinal direction of the moveable component.

17. A seal arrangement in accordance with claim 16, wherein that boundary surface which is oriented towards the nearest medium-space end of the sealing element is inclined at a smaller angle with respect to the plane running perpendicularly to the longitudinal direction of the moveable component than that boundary surface which is oriented in the direction away from the nearest medium-space end of the sealing element.

18. A seal arrangement in accordance with claim 1, wherein at least one dynamic sealing section of the sealing element has at least one flattened sealing lip which is supported on the moveable component in the installed state of the seal arrangement (100) by means of a supporting surface aligned substantially in parallel with the longitudinal direction of the moveable component.

19. A seal arrangement in accordance with claim 1, wherein at least one dynamic sealing section of the sealing element has a stripping lip in addition to the sealing lips.

20. A seal arrangement in accordance with claim 19, wherein the stripping lip projects in the axial direction beyond a static sealing section of the same sealing region of the sealing element.

21. A seal arrangement in accordance with claim 20, wherein both dynamic sealing sections of the sealing element each comprise a stripping lip in addition to the sealing lips.

22. A seal arrangement in accordance with claim 19, wherein at least one stripping lip of the sealing element is in the form of a memory stripping lip.

23. A seal arrangement in accordance with claim 1, wherein, in operation of the seal arrangement, the average pressure difference between the first medium space and the second medium space amounts to at least approximately 5 bar, preferably to at least approximately 10 bar.

24. A high-pressure pump comprising at least one seal arrangement in accordance with claim 1.

25. Use of a high-pressure pump in accordance with claim 24 for injecting a fuel into a combustion engine.

* * * * *

UNITED STATES PATENT AND TRADEMARK OFFICE
CERTIFICATE OF CORRECTION

PATENT NO.       : 7,959,159 B2                                    Page 1 of 1
APPLICATION NO.  : 11/903341
DATED            : June 14, 2011
INVENTOR(S)      : Klaus Hocker et al.

It is certified that error appears in the above-identified patent and that said Letters Patent is hereby corrected as shown below:

Title Pg, replace [73] Assignee Robert Bosch GmbH city of residence
with --Gerlingen-Schillerhöhe (DE)--.

Column 12, Claim 1, line 39,   replace --bf-- with --of--.

Column 12, Claim 1, line 42,   remove --a--.

Column 12, Claim 1, line 47,   replace --neighboring-- with --neighbouring--.

Column 12, Claim 1, line 57,   replace --sealings-- with --sealing lips--.

Column 12, Claim 1, line 58,   replace --he-- with --the--.

Signed and Sealed this
Twenty-seventh Day of March, 2012

David J. Kappos
*Director of the United States Patent and Trademark Office*